United States Patent Office 3,734,756
Patented May 22, 1973

3,734,756
FINELY DIVIDED ALKALI METAL SILICATE GLASS
Richard H. Pierce, Broomall, Pa., assignor to Philadelphia Quartz Company, Philadelphia, Pa.
No Drawing. Filed June 16, 1971, Ser. No. 153,806
Int. Cl. C04b 35/16
U.S. Cl. 106—74                10 Claims

ABSTRACT OF THE DISCLOSURE

A method has been developed to prepare alkali metal silicate glasses of small particle size that dissolve readily and do not contain significant amounts of impurities from the grinding equipment. The method consists of casting molten alkali metal silicate glass in a thin sheet or film which is then thermally stressed and fractured before grinding.

INTRODUCTION

The preparation of soluble sodium silicate glasses has been known and practiced for many years. These glasses are, of course, the basis for the production of sodium silicate solutions, but the glasses themselves, are also articles of commerce. One of the problems associated with the manufacture of these glasses, which prevents use of such glasses in more applications, is reducing the particle size, economically and without the introduction of impurities, to the point at which the particles hydrate and dissolve readily. Silicate glasses can be formed as cakes fractured to chunks and then ground with jaw crusher ball mills and the like to very fine powders but this method has disadvantages. The silicate glasses are very hard and abrade the surfaces of the grinding equipment and the glass picks up considerable amounts of insoluble impurities. The abrasion of the grinding surfaces also necessitates frequent replacement of wear parts. Also great amounts of energy are required to implement these processes. The intense pressures and heat built up by these grinding methods also softens the silicate glass so that the particles become rounded providing a reduced surface area for hydration and dissolution.

A method has been found to produce finely divided anhydrous alkali metal silicate glass powders that are essentially free of insoluble impurities that emanate from the grinding equipment and that do have irregular particle shapes that hydrate and dissolve readily. The methods include casting a thin sheet or film of molten alkali metal silicate glass and subjecting the sheet or film to rapid chilling to a low temperature after the glass has set to a non-fluid system. This thermal shock causes stresses and partial fractures of the glass which allows the glass to be ground to small particles more easily. The resulting fine glass particles hydrate and dissolve readily and almost completely, and can be used in many applications including detergent formulations.

THE INVENTION

The alkali metal silicate glasses used in this invention can be produced by any method, for example, fusion of NaCl, sand and steam; the fusion of $Na_2SO_4$, sand and carbon; and, of course, the fusion of $Na_2CO_3$ with sand. Potassium silicate glasses or glasses with both sodium and potassium cations are useful. The mole ratio of $SiO_2/M_2O$ can be between 1.2/1.0 and 4.0/1.0; M stands for an alkali metal or combination of alkali metals. The mole ratio of $Na_2O/K_2O$ in the mixed alkali glass can be between 15.0/1.0 and 1.0/1.0. The molten glass is cast in a sheet. The glass is allowed to cool until it sets and becomes a solid and then it is chilled to below 0° C. as quickly as possible. The rapid contraction of the glass sheet causes stresses and faults in the glass and the sheet shatters when deformed or fractured. The stresses and faults allow the particles to be ground without applying larger pressures and forces. It is especially advantageous to grind the glass while it is cold and brittle.

The sheet of molten glass is most conveniently cast on a conveyor made of heat and cold resistant material. However, with the thin films used the duration of the heating and chilling periods are short. The thickness of the film is important; it must be thin to allow complete and quick chilling but it must also be thick enough to allow a high production rate without a huge, costly conveyor system. The film thickness can vary between 5 and 100 mm. The glass is drawn from the furnace and cast as a film at temperatures between 1200 and 1500° C. The film may be allowed to cool at ambient conditions until it has set to a pliable solid at about 500 to 600° C. Then the sheet or film is subjected to rapid chilling to temperatures of 0° C. or below. A cold fluid bath or spraying of a cold fluid other than water on the glass can be used but the preferred method is to draw the thin sheet or film through a refrigerated zone or between chiller rollers. The glass should be chilled in a very short time to a low temperature. Therefore, the refrigerated zone and chiller rolls should be below about —10° C.

The cold glass sheet is quite brittle and can be fractured easily, so that when the conveyor leaves the chilling zones or rollers, the glass can be discharged from the conveyor by flexing it around a pulley or roller. The glass shatters off the belt into a hopper and is fed into a grinder so that the glass is ground before warming up. The glass is stressed and has many partial fractures and can be ground easily without applying great pressure or force.

The products of these processes are irregularly shaped, finely divided alkali metal silicate glass particles. The particle size is controlled by the final grinding step but the product is finer than 48 mesh and can be ground finer than 150 mesh quickly and without much energy required. The bulk density of the product varies between 55 and 75 lbs./cu. ft. The solubility of the product is very good and very little undissolved material remains after solution is achieved. The irregular, non-rounded particle shapes contribute greatly to the rapid hydration and dissolution of the glass.

The fast dissolving rate and complete solution allows these glasses to be used in applications that presently need hydrous silicates. These finely divided glasses are particularly useful in detergent formulations where they are combined and dissolved with the other detergent ingredients in a crutcher and then the resulting slurry spray dried to form a complete detergent.

EXAMPLES

A further understanding of the invention can be obtained from the following illustrative examples which describes certain embodiments of the invention and should not be considered restrictive. The $SiO_2/M_2O$ ratios are on a mole basis unless otherwise indicated and the mesh sizes are Tyler series screens.

Example 1

A sodium silicate glass was prepared by fusing soda ash and glass sand at 1400° C. The $SiO_2/Na_2O$ ratio was 2.00/1.00. The glass was drawn from the furnace and cast as a 15 mm. film. The film was allowed to cool to ambient temperature and ground about an hour after that. The sheet was fractured and passed through a jaw crusher. After 3 passes through the crusher 30% of the glass had been reduced to less than 100 mesh. The remaining glass was charged into a ball mill and rotated for 15 minutes, another 30% of the glass had been reduced to less than 100 mesh. The remaining material was returned to the mill and after 30 minutes more of rotation another 35% of the glass was reduced to less than 100 mesh. Therefore 3 passes through the jaw crusher and 45 minutes ball milling were necessary to reduce 95% of the glass to less than 100 mesh. The glass contained 0.71% insoluble impurities and had a considerable amount of undissolved glass-like residue when 5 g. of the particles were dissolved in 95 g. of water at 70° C. for 10 minutes.

Example 2

The molten glass of Example 1 was drawn from the furnace and cast as a 15 mm. film. The glass film was allowed to cool until it had set to a pliable solid at about 575° C. Then the film was refrigerated at −16° C. until the glass was at −10° C. temperature. The temperature reduction took 30 seconds. The film was flexed and fractured readily. It was passed through the jaw crusher while cold. In one pass 40% of the glass was reduced to less than 100 mesh. The remainder was ball milled and after 10 minutes 54% of the glass had been reduced to less than 100 mesh. Therefore, only one pass through the jaw crusher and 10 minutes ball milling were necessary to reduce 94% of the glass to less than 100 mesh. The glass contained less than 0.15% insoluble impurity and 5 g. of the fine powder dissolved in 95 g. of water at 70° C. in 7 minutes.

Example 3

The 15 mm. glass film was prepared as in Example 2 but was passed through chiller rolls at −25° C. The temperature of the glass was reduced to −10° C. in 17 seconds. The film was fractured by flexing and 98% was reduced to less than 100 mesh by one pass through the jaw crusher and 10 minutes in the ball mill. The glass contained less than 0.15% insoluble impurities and 5 g. of the fine powder dissolved in 95 g. of water at 70° C. in 7 minutes.

Example 4

A sodium-potassium double silicate glass with an $SiO_2/Na_2O+K_2O$ ratio of 2.51/1.00 was prepared by fusing $K_2CO_3$ and $Na_2CO_3$ with sand at 1400° C. The mole ratio of $Na_2O/K_2O$ was 10.0/1.0. The molten glass was cast in a film of 50 mm. on a conveyor belt. The glass cooled to about 600° C. before the conveyor passed between the chiller rolls of Example 3 but cooled to −30° C. It took 55 seconds to cool the glass to −10° C. The glass was discharged from the belt and granulated. The glass was reduced to less than 200 mesh by 2 passes through the jaw crusher and 20 minutes ball milling. The glass contained less than 0.15% insoluble impurities and had very little undissolved residue when 25 g. of the glass dissolved in 75 g. of water at 90° C. for 10 minutes.

Example 5

A spray dried, home laundry detergent was made using the product of Example 2. A slurry of the following composition was prepared in a crutcher.

| | P.b.w. |
|---|---|
| Surfactant paste (28% linear dodecylbenzene sulfonate, 22% $Na_2SO_4$ and 50% $H_2O$) | 64.0 |
| Sodium tripolyphosphate (inorganic sequestering agent) | 30.0 |
| Sodium glucoheptonate (organic sequestering agent) | 15.0 |
| Sodium silicate glass of Example 2 (2.00 $SiO_2/Na_2O$, 100 mesh) | 18.0 |
| Sodium carboxymethyl cellulose (antiredeposition agent) | 1.5 |
| Blancophor RG (optical brightener, GAF Corp.) | 0.3 |

The slurry was heated for about 10 minutes at 88° C. during which time the glass dissolved. Then the slurry was spray dried to about 10% moisture content. The product was an efficient laundry compound that dissolved completely in household washing machines.

More or less detailed claims will be presented hereinafter and even though such claims are rather specific in nature those skilled in the art to which this invention pertains will recognize that there are obvious equivalents for the specific materials recited therein. Some of these obvious equivalents are disclosed herein, other obvious equivalents will immediately occur to one skilled in the art, and still other obvious equivalents could be readily ascertained upon rather simple, routine, noninventive experimentation. Certainly no invention would be involved in substituting one or more of such obvious equivalents for the materials specifically recited in the claims. It is intended that all such obvious equivalents be encompassed within the scope of this invention and patent grant in accordance with the well-known doctrine of equivalents, as well as changed proportions of the ingredients which do not render the composition unsuitable for the disclosed purposes. Therefore, this application for Letters Patent is intended to cover all such modifications, changes and substitutions as would reasonably fall within the scope of the appended claims.

What I claim is:

1. In the production of finely divided anhydrous alkali metal silicate glass particles having a particle size of less than 48 mesh by grinding from a molten alkali metal silicate having an $SiO_2/M_2O$ mole ratio between 1.2/1.0 and 4.0/1.0 the improvement comprising the steps of:
    (a) casting the molten alkali metal silicate glass into thin sheets of between 5 and 100 mm.,
    (b) solidifying said sheet by cooling,
    (c) chilling said solidified sheet to at least 0° C. as rapidly as possible, and
    (d) grinding said rapidly chilled sheets.

2. The process of claim 1 wherein said molten glass is cooled to temperatures of 500 to 600° C.

3. The process of claim 1 wherein said rapid chilling causes stresses and faults in the glass sheet.

4. The process of claim 1 wherein said chilled sheets are shattered prior to grinding.

5. The process of claim 1 wherein said grinding takes place while the glass is cold and brittle.

6. The process of claim 1 wherein said molten alkali metal silicate is selected from the group consisting of sodium silicate, potassium silicate, and sodium-potassium double silicates.

7. The process of claim 1 in which the glass is chilled in a cold fluid bath.

8. The process of claim 1 in which the glass is chilled by spraying a cold fluid on the glass.

9. The process of claim 1 in which the glass is chilled by conveying it through a refrigerated zone.

10. The process of claim 1 in which the glass is chilled between chiller rolls.

References Cited

UNITED STATES PATENTS

| 1,357,183 | 10/1920 | Phillips et al. | 106—74 |
| 2,950,570 | 8/1960 | Cowles et al. | 23—110 A |

JAMES E. POER, Primary Examiner